(No Model.)
W. C. ANDREWS.
METHOD OF TRANSPORTATION.
No. 449,102. Patented Mar. 31, 1891.
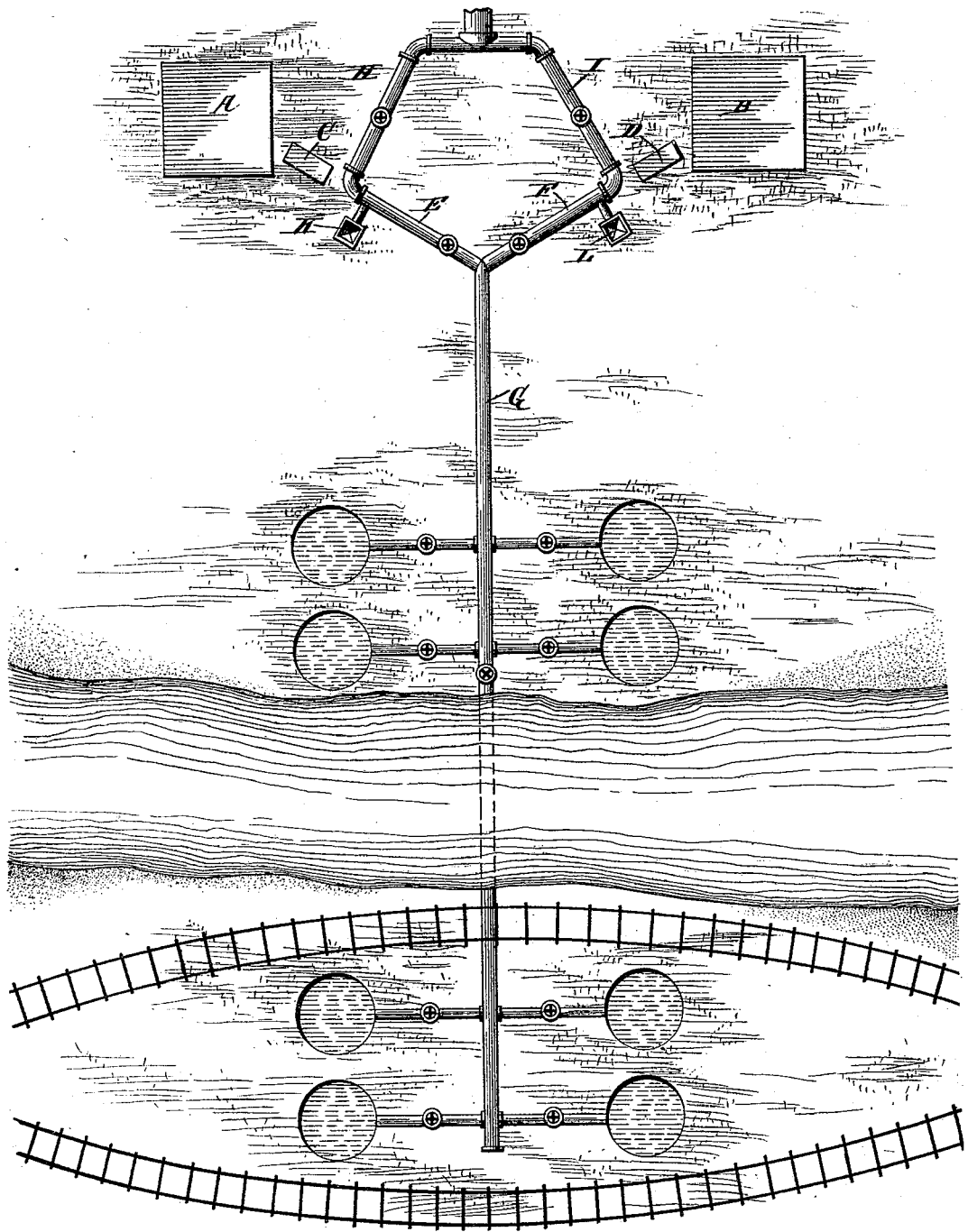
WITNESSES
INVENTOR
Wallace C. Andrews;
by R. G. Dyrenforth
his Attorney

UNITED STATES PATENT OFFICE.

WALLACE C. ANDREWS, OF NEW YORK, N. Y.

METHOD OF TRANSPORTATION.

SPECIFICATION forming part of Letters Patent No. 449,102, dated March 31, 1891.

Application filed March 26, 1889. Serial No. 304,900. (No model.)

*To all whom it may concern:*

Be it known that I, WALLACE C. ANDREWS, a citizen of the United States, residing at New York, in the county of New York and State of New York, have invented certain new and useful Improvements in Methods of Transportation; and I do hereby declare the following to be a full, clear, and exact description of the invention, such as will enable others skilled in the art to which it appertains to make and use the same.

This invention relates to transportation.

The object is in a ready and efficient manner and with great facility and cheapness to convey substance or substances in quantity to long distances without the necessity of actual carriage of such substance or substances—that is, without cartage, conveyance by rail, or similar carriage, and without the necessity of the loading and unloading now usually incident thereto.

With this object in view the invention resides in the method of transportation of suitable substance or substances, which consists in taking solid matter in an artificial or even a natural condition of requisite fine division, introducing the same into liquid, conveying the mixture to a distance through pipes by gravity or by force-pumps, then depositing it in suitable receptacles—such as reservoirs, ponds, or tanks—and separating by subsidence or by flotation of the suspended matter, or by mechanically separating the solid from the liquid, or the liquid from the solid matter, the solid matter then to be taken away in quantities, as desired.

In the accompanying drawing, forming part of this specification, and in which like letters and marks of reference indicate corresponding parts, I have illustrated in a general way and rather by diagram one manner of carrying my invention into effect.

The figure represents a plan view of an apparatus capable of carrying my invention into effect.

Heretofore in the transportation of solid substance—such as coal-slack or coal-dust, cotton or cotton-seed, and the like—resort has been had solely to conveyance by actual carriage—that is, by cartage, rail, or boat—and where the source of supply, as the mines or the place of collection and growth, was remote the mode of transportation has been both difficult and expensive.

By my invention it is proposed to obviate much difficulty and a large share of the expense heretofore incurred, and to make a permanent channel through which the substance can be carried to any distance by conveyance through pipes by water, (generally readily available,) and thus to facilitate to the utmost the transportation and to reduce the expense to a minimum.

The substances which I have primarily in mind to transport are coal-slack or coal-dust, cotton, or cotton-seed; but my invention is also applicable to the transportation and conveyance of other substances—such as wood or straw—in a state of fine division or in pulp form.

The substance to be transported is to be suspended in water and carried in pipes to the point of destination. There the water carrying the substance is to be run into suitable reservoirs, ponds, or tanks, and to be separated from the substance. This can be done by allowing the substance to part from the water by gravity, where the substance is heavier than the water, the same being deposited, and where the water is heavier than the substance, the substance rising to the top can be mechanically removed, or the water may be drawn off, or the mixture may be screened.

In the case of coal and similar substance, before suspending it in water, I reduce it by grinding or crushing, by any mechanical means, preferably by rollers, to a state of fine division—that is, to a very fine powder. The transportation through pipes is effected by gravity, or by pumping either direct, or by the intermediate use of stand-pipes. The substance may be suspended in the water either before admission of the water to the pipe or to be fed to the water as it passes through the pipe.

My invention is carefully to be distinguished from methods of hydraulic mining, in which earth containing mineral is suspended in water passing through conduits from a higher to a lower level, or from a lower to a higher level, merely for the purpose of separation and washing.

My invention is a different sense-concept, being for the transportation of substance suspended in water in pipes by employing water as the vehicle therefor, merely removing the substance from its vehicle at the end of its carriage.

My invention is also carefully to be distinguished from methods of transportation of liquids through pipes, such as transportation of oil or the running from one spot to another of sugar-liquor, brine, or other solution. In case of sugar or salt the liquid may be evaporated, leaving the sugar or salt substance behind; but my invention is to be distinguished from anything of this kind by the fact that I am conveying a substance unchanged from one place to another, the same being carried by water merely as a vehicle, being insoluble in such liquid. I thus constitute a new mode or means of transportation exceedingly valuable in many places, and I claim it as a transportation line intended to compete for the purposes with railroads, steamboats, and other existing modes of transportation.

Operating on coal, my mode of procedure is specifically as follows: I first reduce the coal to the condition of dust or fine powder. Then I feed it to a stream of water passing through a pipe, the pipe emptying upon a screen or directly into a pond or tank, where I allow the dust to subside, after which I draw off the water, remove the coal, and, if desirable, dry it.

In the drawings, A and B indicate the situation of two coal-mines or places of deposit of mined coal.

C and D are rotary coal-crushers for reducing coal to a fine condition.

E and F are branch pipes leading from near the crushers to a main pipe G.

H and I are branch pipes leading to the pipes E and F from a water-supply pipe, through which a proper head of water comes and passes through the branch pipes H and I to branch pipes E and F, and thus through the pipe G. The branch pipes are provided with suitable shut-off valves.

K and L are hoppers leading, respectively, into the branch pipes E and F, and into these hoppers, or either of them, the fine coal is fed, the same passing therefrom into the stream of water. The hoppers are preferably provided with stirrers or mechanical feeding devices—such as screw conveyers—to deliver the coal properly to the stream and prevent floating up. The pipe G is shown as leading toward a river and passing under the bed of the same to the opposite bank, where it branches into several ponds or reservoirs, such reservoirs being in the immediate vicinity of a railway, so that the coal, after settling in the ponds or tanks from which it is to be removed, or where it is to be dried before removal by means either natural or artificial, may be further distributed and by common carriage. It is understood, also, that the branch pipes here are to be supplied with suitable shut-off valves, and the ponds or reservoirs have overflow or drainage gates and outlets which may be provided with suitable screens. The main pipe G is also shown as branching into ponds before crossing the river, the said pipe being provided with a shut-off valve beyond the branches, so that the flow need not extend across the river, but may be led into the ponds, or to any pond here, through the suitably-valved branch pipes. These ponds are shown in the immediate neighborhood of a steamboat-landing, so that the coal after separation from the water, may be further distributed by other known means of common carriage.

It is my intention to take fine coal at the mouth of the coal-mines, (now in many cases a waste product by reason of the cost of carriage,) cotton, or cotton-seed from plantations now remote and transport it through the main pipe G, or as circumstances may justify, to distances of even hundreds of miles to towns and cities, or to navigable rivers, lakes, and the sea-coast, the propelling power to be hydraulic or static, either or both, the coal, cotton, or cotton-seed riding on the water or in the water in suspension, (and never in solution.)

Having thus fully described my invention, what I claim as new, and desire to secure by Letters Patent, is—

The method of transportation herein described, involving the following operations: first, providing an inclosed stream of running liquid; second, reducing the material to be transported if too large or of too great specific gravity by comminution to a condition in which it will be carried by the momentum of the liquid; third, introducing into the running stream the material to be transported, and, finally, separating the same from the liquid at the place of destination, substantially as described.

In testimony whereof I affix my signature in presence of two witnesses.

WALLACE C. ANDREWS.

Witnesses:
R. G. DYRENFORTH,
A. W. BELL.